US005365256A

United States Patent [19]

Takahashi

[11] Patent Number: 5,365,256

[45] Date of Patent: Nov. 15, 1994

[54] RECORDING APPARATUS WITH RECORDING MEDIUM CONVEYANCE CONTROL FOR FIXING RECORDED INK

[75] Inventor: Tsutomu Takahashi, Kawasaki, Japan

[73] Assignee: Canon Kabushiki Kaisha, Tokyo, Japan

[21] Appl. No.: 194,639

[22] Filed: Feb. 10, 1994

Related U.S. Application Data

[63] Continuation of Ser. No. 982,061, Nov. 25, 1992, abandoned, which is a continuation of Ser. No. 635,680, Dec. 28, 1990, abandoned.

[30] Foreign Application Priority Data

Dec. 29, 1989 [JP] Japan .................................. 1-344923

[51] Int. Cl.[5] .......................... G01D 15/18; B41J 2/01; B41J 29/38; B41F 5/02

[52] U.S. Cl. ...................................... 347/16; 400/695; 400/697; 271/902; 101/230; 347/102

[58] Field of Search ...................... 346/1.1, 140 R, 25, 346/75, 134; 400/126, 695, 697; 101/230; 271/902, 288

[56] References Cited

U.S. PATENT DOCUMENTS

| | | | |
|---|---|---|---|
| 3,925,789 | 12/1975 | Kashio | 346/75 |
| 4,207,579 | 6/1980 | Gamblin et al. | 346/75 |
| 4,313,124 | 1/1982 | Hara | 346/140 R |
| 4,345,262 | 8/1982 | Shirato et al. | 346/140 R |
| 4,459,600 | 7/1984 | Sato | 346/140 R |
| 4,463,359 | 7/1984 | Ayata et al. | 346/1.1 |
| 4,469,026 | 9/1984 | Irwin | 400/126 |
| 4,558,333 | 12/1985 | Sugitani et al. | 346/140 R |
| 4,723,129 | 2/1988 | Endo et al. | 346/1.1 |
| 4,740,796 | 4/1988 | Endo et al. | 346/1.1 |
| 4,758,102 | 7/1988 | Onoda | 400/18 |
| 4,799,811 | 1/1989 | Beck et al. | 400/279 |
| 4,872,027 | 10/1989 | Buskirk et al. | 346/140 R |
| 5,005,025 | 4/1991 | Miyakawa et al. | 346/25 |
| 5,021,805 | 6/1991 | Imaizumi | 346/140 R |

FOREIGN PATENT DOCUMENTS

| | | | |
|---|---|---|---|
| 59-123670 | 7/1984 | Japan . | |
| 59-138461 | 8/1984 | Japan . | |
| 0129288 | 7/1985 | Japan | 400/697 |

*Primary Examiner*—Benjamin R. Fuller
*Assistant Examiner*—Eric Frahm
*Attorney, Agent, or Firm*—Fitzpatrick, Cella, Harper & Scinto

[57] ABSTRACT

A recording apparatus such as an ink jet printer or bubble jet printer consists of a recording head to record by discharging an ink to a recording paper; a conveying device to convey the recording paper; an instructing device to instruct to convey the recording paper in the direction opposite to that upon recording; and a conveyance controller to control the conveying device so as to inhibit the backward conveyance of the recording paper in the case where the recorded ink is not fixed yet when the recording paper is conveyed backward in response to the instruction of the backward conveyance. The discrimination regarding whether the recorded ink is not fixed yet is performed on the basis of the elapsed time after the recording by using a timer.

88 Claims, 4 Drawing Sheets

RECORDING APPARATUS WITH RECORDING MEDIUM CONVEYANCE CONTROL FOR FIXING RECORDED INK

This application is a continuation of application Ser. No. 07/982,061 filed Nov. 25, 1992, now abandoned, which is a continuation of application Ser. No. 07/635,680 filed Dec. 28, 1990, abandoned.

BACKGROUND OF THE INVENTION

1. Field of the Invention

The present invention relates to a recording apparatus.

2. Related Background Art

Hitherto, as a recording apparatus for recording on a recording medium (hereinafter, referred to as a recording paper or, simply, a paper) such as paper, sheet for OHP, or the like, recording apparatuses with forms having recording heads based on various recording methods have been proposed. There are recording heads of the wire dot type, thermo sensitive type, thermal copy transfer type, ink jet type, and the like.

Particularly, the ink jet type is highlighted as a silent recording method with low running costs because the ink is directly discharged onto a recording paper.

In such an ink jet recording apparatus, the recording is executed by a recording head of the serial type or the full multiple type and, at the same time, the recording paper is fed in a predetermined direction.

However, generally, in the recording apparatus, there is a case where the recording paper which was once fed in a predetermined direction is returned backward and the recording is performed at the returned position due to factors on a recording process or control. For instance, even in a recording apparatus which is installed in an electronic typewriter, there is a case where such a return process is executed because the typist forgot to print or the like.

However, since the ink jet recording apparatus uses a liquid ink as a recording agent, it takes a short time until the recorded ink is dried. Therefore, if the recording paper is returned in a state in which the ink is not fixed yet, there is a fear such that the conveying system and, further, the recording paper itself are polluted by the ink due to the contact between the recording medium conveying system and the unfixed portion of the recording paper and the quality of the data recorded on the recording paper is deteriorated due to rubbing or the like.

SUMMARY OF THE INVENTION

It is an object of the invention to solve the above problems.

Another object of the invention is to provide a recording apparatus comprising: a recording head to record by discharging an ink to a recording medium; conveying means for conveying the recording medium in a predetermined direction in association with the progress of the recording and for conveying the recording medium backward in response to an instruction; instructing means for instructing the backward conveyance; and inhibiting means for inhibiting the backward conveyance which causes a contact between an unfixed portion of the ink and a member to convey the recording medium in the case where the recorded ink is not fixed yet when the recording medium is conveyed backward in response to the instruction.

Further another object of the invention is to provide a recording apparatus which can avoid an inconvenience such that in the case where an ink recorded on a recording medium is not fixed yet, the recording medium comes into contact with a member of a conveying system due to the backward conveyance, or the like.

Further another object of the invention is to provide a recording apparatus comprising: a recording head to record by discharging an ink to a recording medium; conveying means for conveying the recording medium; instructing means for instructing to convey the recording medium in a direction opposite to the direction upon recording; and conveyance control means for controlling the conveying means so as to inhibit the backward conveyance of the recording medium in the case where the recorded ink is not fixed yet when the recording medium is conveyed backward in response to such an instruction.

Further another object of the invention is to provide a recording apparatus comprising: discriminating means for discriminating the kind of printing device which is connected; conveying means for conveying a recording medium; instructing means for instructing to convey the recording medium in a direction opposite to the direction upon recording; and control means for controlling the execution of the backward conveyance based on the instruction from the instructing means on the basis of the result of the discrimination from the discriminating means.

DETAILED DESCRIPTION OF THE PREFERRED EMBODIMENTS

An embodiment of the present invention will be described in detail hereinbelow with reference to the drawings.

The invention can be also applied to a system which is constructed of a plurality of apparatuses or to an apparatus comprising a single apparatus. It will be obviously understood that the invention can be also applied to the case where the invention is accomplished by providing a program to a system or an apparatus.

Figure 1A:
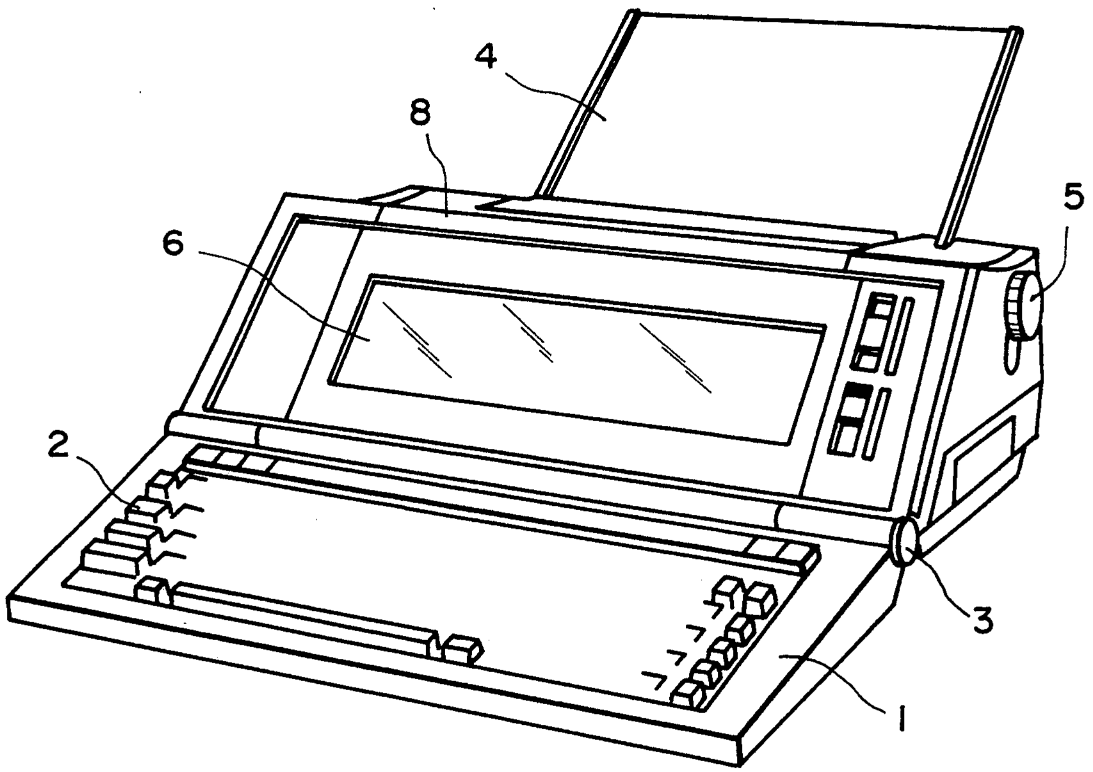
FIGS. 1A and 1B are external perspective views showing a using state and an enclosing state of an electronic typewriter as an apparatus according to an embodiment of the present invention.
Figure 1B:
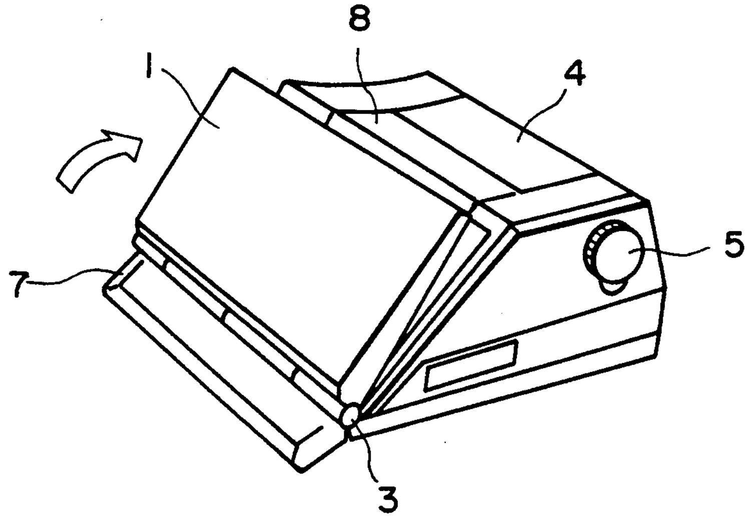

FIGS. 1A and 1B show an example of an external construction of an electronic typewriter as an apparatus to which the invention can be applied.

Reference numeral 1 denotes a keyboard section. A group of keys 2 such as keys to input letters such as characters, numerals, or the like, control keys, and the like are arranged in the keyboard section 1. When the apparatus is not used, the keyboard 1 can be folded up as shown in FIG. 1B by rotating the keyboard around a hinge 3. Reference numeral 4 denotes a paper feed tray to feed a sheet-like recording medium to a printer section in the apparatus. When the apparatus is not used, the tray 4 is also similarly folded down and enclosed so as to cover the printer section as shown in FIG. 1B. Reference numeral 5 denotes a feed knob to manually set and discharge the recording medium; 6 a display to display input sentences or the like; and 7 a carrying handle which is used to carry the apparatus according to the embodiment.

Figure 2:
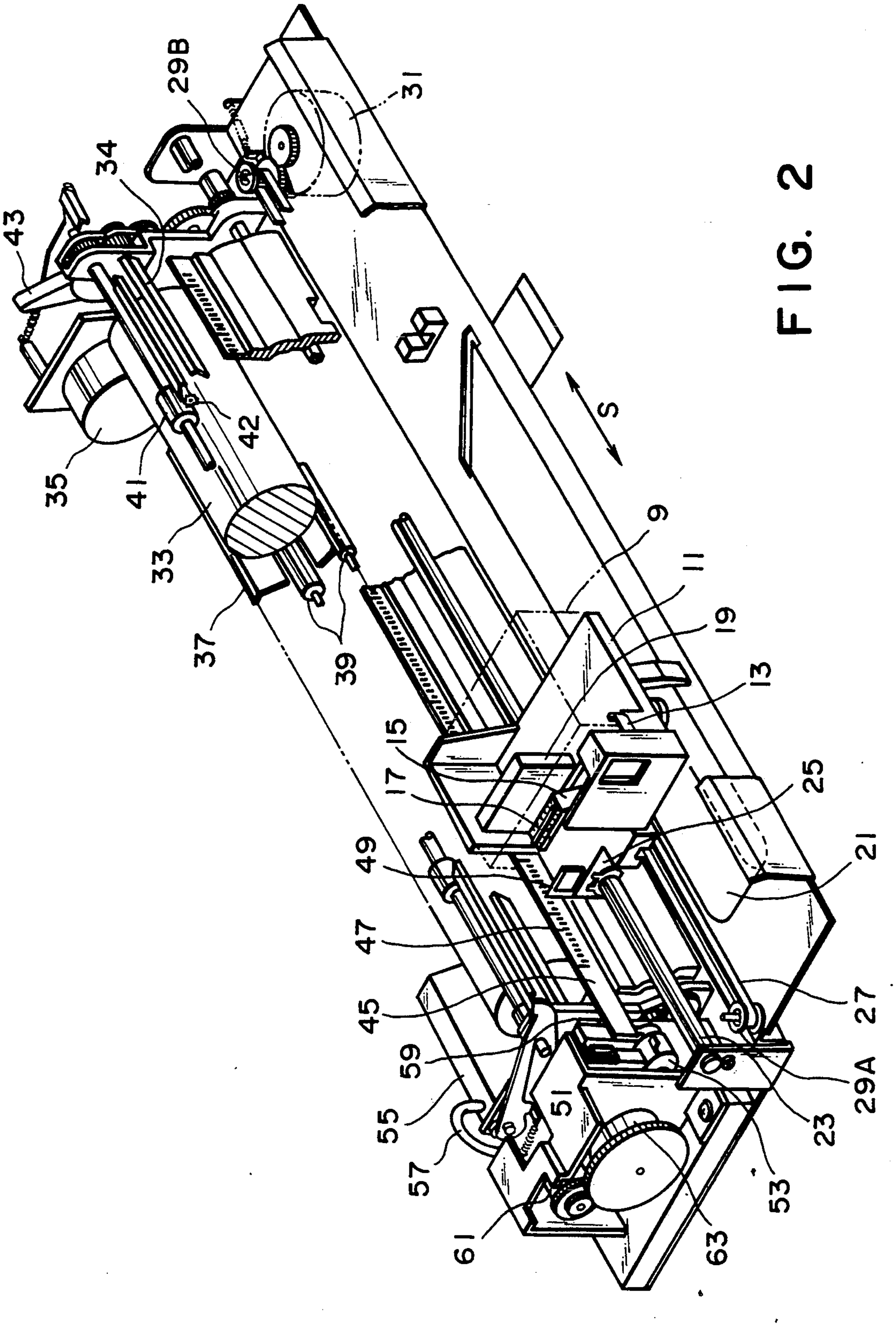
FIG. 2 is a perspective view showing an example of a construction of a printer which can be applied to the invention.

FIG. 2 shows an example of a construction of the printer section according to the embodiment.

Reference numeral 9 denotes a head cartridge having an ink jet recording head; 11 a carriage on which the head cartridge 9 is mounted and which scans in the directions indicated by arrows S in the diagram; 13 a hook to attach the head cartridge 9 to the carriage 11; and 15 a lever to operate the hook 13. A marker 17 is provided on the lever 15 and is used to indicate a scale provided for a cover, which will be explained hereinlater, and to enable a printing position, a setting position, or the like to be read by the recording head of the head cartridge. Reference numeral 19 denotes a supporting plate to support an electric connecting section for the head cartridge 9 and 21 indicates a flexible cable to connect the electric connecting section to a control section of the apparatus main body.

Reference numeral 23 denotes a guide shaft to guide the carriage 11 in the S directions. The guide shaft 23 is penetrated into a bearing 25 of the carriage 11. Reference numeral 27 denotes a timing belt to which the carriage 11 is fixed and which transfers a motive power for moving the carriage 11 in the S directions. The timing belt 27 is moved between pulleys 29A and 29B arranged in both side portions of the apparatus. A driving force is transferred to the pulley 29B from a carriage motor 31 through a transfer mechanism such as a gear and the like.

Reference numeral 33 denotes a conveying roller for restricting a recording surface of the recording medium (hereinafter, also referred to as a recording paper) such as a paper or the like and for conveying the recording paper upon recording or the like. The roller 33 is driven by a feed motor 35. Reference numeral 37 denotes a paper pan for leading the recording medium to a recording position from the side of the feed tray 4. Reference numeral 39 denotes feed rollers which are arranged on the way of a feeding path of the recording medium and depress the recording medium toward the feed roller 33, thereby conveying the recording medium. Reference numeral 34 denotes a platen which faces the discharge port forming surface of the head cartridge 9 and restricts the recording surface of the recording medium; 41 indicates discharge rollers which are arranged downstream of the recording position in the feeding direction of the recording medium and are used to discharge the recording medium toward a paper discharge port (not shown); 42 rowel spurs which are provided in correspondence to the discharge rollers 41 and depress the rollers 41 through the recording medium, thereby causing a conveying force of the recording medium by the discharge rollers 41; and 43 a release lever to release the urging operations of the feed rollers 39, a pressing plate 45, and rowel spurs 42, respectively, when the recording medium is set or the like.

Reference numeral 45 denotes the pressing plate for suppressing a floating or the like of the recording medium at a position near the recording position, thereby assuring an adhering state to the feed roller 33. In the embodiment, the ink jet recording head for recording by discharging the ink is used as a recording head. Therefore, a distance between the ink discharge port forming surface of the recording head and the recording surface of the recording medium is relatively very small and must be severely managed so as to avoid the contact between the recording medium and the discharge port forming surface, so that it is effective to arrange the pressing plate 45. Reference numeral 47 denotes a scale provided on the pressing plate 45 and 49 indicates a marker provided on the carriage 11 in correspondence to the scale 47. The printing position and the setting position of the recording head can be also read by the scale and marker.

Reference numeral 51 denotes a cap made of an elastic material such as a rubber or the like which faces the ink discharge port forming surface of the recording head at the home position. The cap 51 is supported so as to be come into contact with and be detachable from the recording head. The cap 51 is used to protect the recording head and to execute a discharge recovery process of the recording head in the non-recording mode or the like. The discharge recovery process denotes a process (pre-discharge) such that by driving energy generating elements which are arranged at internal positions of the ink discharge ports and are used to discharge the inks, the inks are discharged from all of the discharge ports, thereby eliminating the discharge defective factors such as air bubbles, dusts, inks which became unsuitable to record because of an increase in viscosity or a process to eliminate the discharge defective factor by forcedly discharging the inks from the discharge ports independent of the above pre-discharge.

Reference numeral 53 denotes a pump which makes a suction force operative to forcedly discharge the ink and is used to suck out the ink which was collected into the cap 51 when the discharge recovery process is executed by the forced discharge or the discharge recovery process is executed by the pre-discharge. Reference numeral 55 denotes a drain ink tank to store the drained ink which was sucked by the pump 53 and 57 indicates a tube for communicating the pump 53 with the drain ink tank 55.

Reference numeral 59 denotes a blade to wipe the discharge port forming surface of the recording head. The blade 59 is supported so as to be movable between the forward position where the blade is projected to the recording head side and performs the wiping operation during the movement of the head and the backward position where the blade does not come into engagement with the discharge port forming surface. Reference numeral 61 denotes a motor and 63 indicates a cam device which receives a motive power which is transferred from the motor 61, thereby driving the pump 53 and moving the cap 51 and the blade 59, respectively.

Figure 3:
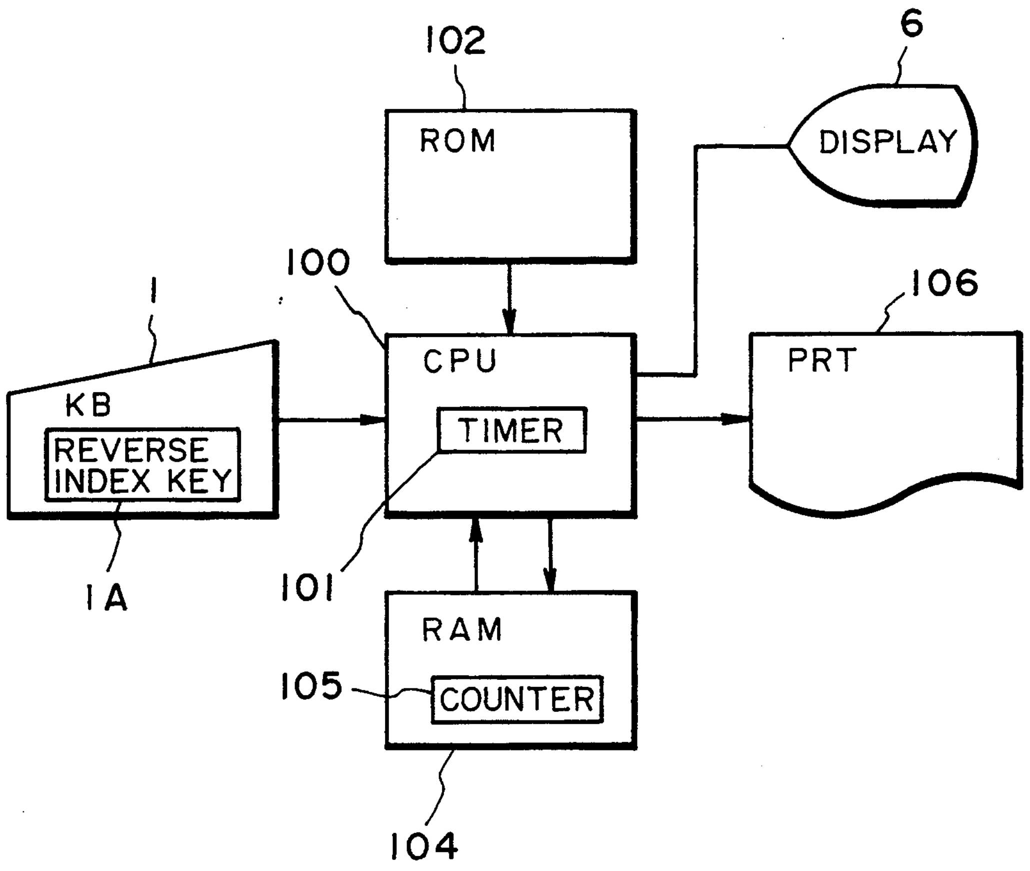
FIG. 3 is a block diagram showing an example of a schematic construction of a control system of an electronic typewriter according to the embodiment.

FIG. 3 shows an example of a schematic construction of a control system of the electronic typewriter according to an embodiment of the invention.

Figure 4:
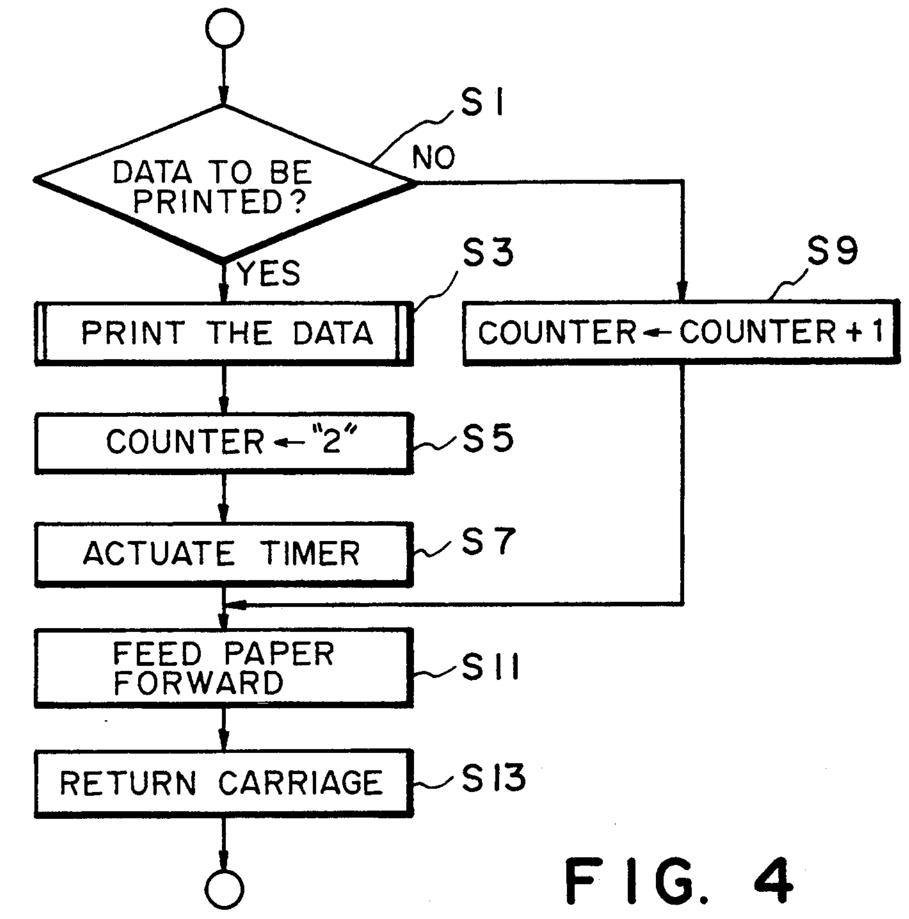
FIG. 4 is a flowchart showing an example of a print processing procedure.
Figure 5:
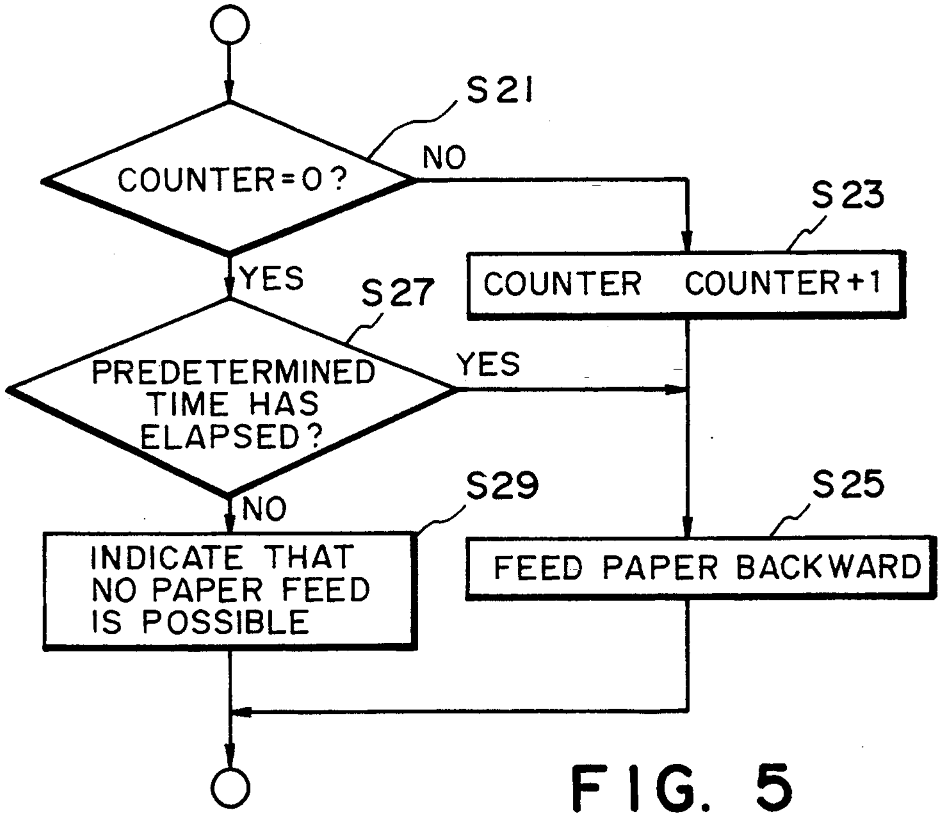
FIG. 5 is a flowchart showing an example of a paper backward feed processing procedure.

Reference numeral 100 denotes a CPU comprising, for example, a microcomputer for controlling the respective sections in accordance with processing procedures or the like, which will be explained hereinlater, as shown in FIGS. 4 and 5. Reference numeral 101 denotes a timer which is provided for the CPU 100 and is used to manage the elapsed time after completion of the recording.

Reference numeral 102 denotes an ROM in which programs corresponding to the processing procedures which are executed by the CPU 100 and fixed data (for instance, data to generate character dots for printing and the like) are stored. Reference numeral 104 denotes an RAM having memory areas to develop and manage the data regarding the printing and memory areas for operations of a counter 105 to set the number of lines which can be returned in a process, which will be explained hereinlater, and the like. Reference numeral 106 denotes an ink jet printer which has been described in FIG. 2. The keyboard 1 shown in FIG. 1A has a reverse index key 1A to instruct to return the recording paper on a line unit basis in accordance with the operation.

FIG. 4 shows an example of a print processing procedure according to the embodiment which is executed every line.

When the print processing procedure is actuated, first, in step S1, a check is made to see if data to be printed to the present line exists or not. If YES, step S3 follows and the print data is printed. In the next step S5, for instance, "2" is set into the counter 105. Such a numerical value is equal to the number of lines corresponding to a distance from the present line to a position where the present line reaches the conveying system member by the return, for instance, a distance from the recording position by the recording head to the pressing plate 45 in the embodiment. Such a numerical value can be obviously properly selected in accordance with such a distance.

Then, in step S7, the timer 101 is reset and restarted. In step S11, the paper is fed forward by a distance corresponding to one line. After that, in step S13, the carriage 11 is returned. If no print data exists for the present line in step S1, the processing routine advances to step S9 and the count value of the counter 105 is incremented by +1. After that, step S11 follows.

FIG. 5 shows an example of a backward feeding (return) procedure of the recording paper according to the embodiment. This procedure is actuated by depressing the reverse index key 1A. The backward feeding operation is executed to perform addition, correction, or the like of the character on the printed line.

When the backward feeding procedure is actuated, in step S21, a check is first made to see if the count value of the counter 105 is "0" or not. If NO, step S23 follows and the count value of the counter 105 is decremented by only "1". In step S25, the recording paper is returned backward by a distance corresponding to one line. When the reverse index key 1A is again or subsequently depressed, the recording paper can be returned by a distance corresponding to the number of lines until the count value of the counter 105 is set to "0". That is, for instance, if the value of the counter 105 is "4" (in the case where two non-printing lines were provided before the line to be printed), by operating the reverse index key 1A, the recording paper can be returned by a distance of four lines. At this time, although the print line is returned from the recording position by a distance of one line, in this state, the relevant print line does not come into contact with the pressing plate 45.

On the other hand, if the count value of the counter 105 is equal to "0" in step S21, step S27 follows and the content of the timer 101 which detects the elapsed time from the print point corresponding to the final print line is discriminated. If it is determined in step S27 that a predetermined time (time which has been predetermined in correspondence to that the recorded ink is set into an enough fixed state) has elapsed, the processing routine advances to step S25 since no problem will occur even if the recording paper is returned.

On the other hand, if it is decided in step S27 that the predetermined time has not elapsed yet, step S29 follows and a fact that the paper cannot be fed backward can be informed to the operator by displaying a message indicative of such a fact on the display 6. As means for informing such a message, voice generating means such as a buzzer or the like can be also used in place of the display or can be also used together with the display. On the other hand, it is also possible to construct in a manner such that the backward feed of the paper is not accepted until the timer 101 detects the elapse of a predetermined time and the paper is fed backward after the elapse of such a time in place of such an alarming method or together with the execution of such a warning. That is, the command for the backward feed can be cancelled or can be temporarily stopped and the backward feed can be also executed after the elapse of a predetermined time. As a timer which is used in the embodiment, the timer for the recovery process in the ink jet (for instance, if the printing is not executed for 30 seconds, the ink jet nozzle is covered by the cap or the like) can be commonly used.

Although not shown, it is also possible to construct in a manner such that the kind of the printer 106 is recognized by the CPU 100 through an interface (not shown) and if the kind relates to the ink recording type, the foregoing control is executed, and if it is not the ink recording type but is, for example, one of the wire-dot printer type, the thermal copy transfer printer type, and the like, the recording paper is immediately fed backward.

Among the ink jet recording systems, particularly, the invention is effective in the recording head and recording apparatus of the bubble jet system. This is because according to the above system, a high density and a high precision of the recording can be accomplished and it has been taught that it takes a time to fix.

As typical construction and principle of such a system, for instance, it is preferable to use the fundamental principles disclosed in U.S. Pat. Nos. 4,723,129 and 4,740,796. The above system can be applied to any one of what are called on-demand type and continuous type. Particularly, however, in the case of the on-demand type, at least one driving signal which gives a rapid increase in temperature which corresponds to recording information and exceeds a nucleate boiling is applied to an electrothermal conversion element arranged in correspondence to a sheet or a liquid path in which a liquid (ink) is held, thereby causing a thermal energy to be generated in the electrothermal conversion element and causing a film boiling on a thermal operational surface of the recording head, so that an air bubble in the liquid (ink) can be eventually formed in correspondence to the driving signal in a one-to-one corresponding manner. Therefore, the above system is effective. By discharging the liquid (ink) through the discharge opening by the growth and contraction of the air bubble, at least one liquid droplet is formed. By generating such a driving signal like a pulse, since the growth and contraction of the air bubble are immediately properly executed, the discharge of the liquid (ink) having, especially, a high response speed can be accomplished. Therefore, such a method is more preferable. As a driving signal having a pulse-shape, it is suitable to use driving signals as disclosed in U.S. Pat. Nos. 4,463,359 and 4,345,262. The further excellent recording can be executed by using the conditions as disclosed in U.S. Pat. No. 4,313,124 of the invention regarding a temperature increase ratio of the thermal operational surface.

As a construction of the recording head, in addition to a combination construction (linear liquid passage or orthogonal liquid passage) comprising the discharge port, liquid path, and electrothermal conversion element as disclosed in the specifications of each of the U.S. Patents above, the invention also incorporates constructions in which the thermal operational section is arranged in a bending region as disclosed in U.S. Pat. Nos. 4,558,333 and 4,459,600. In addition, the effects of the invention are also obtained by using a construction in which a common slit is used as a discharge section of the electrothermal conversion element for a plurality of electrothermal conversion elements as disclosed in Japanese Laid-Open Patent Application No. 59-123670 or a construction in which an opening to absorb a pressure wave of a thermal energy is made corresponding to the discharge section as disclosed in Japanese Laid-Open Patent Application No. 59-138461. That is, this is because even if the recording head has any form, the recording can be certainly and efficiently performed.

Further, the invention can be also effectively applied to a recording head of the full line type having a length corresponding to the maximum width of a recording medium which can be recorded by a recording apparatus. As such a recording head, it is possible to use a construction in which such a length is satisfied by using a combination of a plurality of recording heads or a construction in which a single recording head formed integratedly is used. In addition, even in the case of the serial type recording head as mentioned above, the invention is effective to the case of using a recording head of the exchangeable chip type in which by attaching the head to the apparatus main body, it can be electrically connected to the apparatus main body or the ink can be supplied from the apparatus main body or the case of using a recording head of the cartridge type which is integratedly mounted to the recording head itself.

On the other hand, the effect of the invention can be further stabilized by adding recovery means for the recording head, spare auxiliary means, and the like which are provided as component elements of the recording apparatus to the invention. Therefore, the above construction is preferable. Practically speaking, if capping means, cleaning means, pressurizing or suction means, and pre-heating means by the electrothermal conversion element or a heating element different from the electrothermal conversion element or a combination thereof are provided for the recording head or if a pre-discharge mode to perform a discharging operation different from the recording operation is executed, those methods are effective to execute the stable recording.

The kinds and the number of recording heads which are installed are not limited to those in the above embodiments. In addition to the construction such that only one recording head is provided in correspondence to the ink of a single color, it is also possible to use a plurality of recording heads in correspondence to a plurality of inks having different recording colors and different concentrations.

Further, a form of the ink jet recording apparatus of the invention is not limited to the above electronic typewriter but the invention can be also used as an image output terminal of an information processing apparatus such as a computer or the like.

As described above, according to the invention, in the case where the ink recorded on the recording medium is not fixed yet, it is avoided that the recording medium comes into contact with the conveying system member by the backward conveyance, so that contamination of the recording medium itself or conveying system can be prevented.

What is claimed is:

1. A recording apparatus comprising:

a recording head for recording by discharging an ink to a recording medium;

conveying means for conveying the recording medium in a recording direction and a reverse direction;

instructing means for instructing said conveying means to convey the recording medium in the reverse direction; and conveyance control means for controlling the conveying means so as to inhibit conveyance of the recording medium in the reverse direction in a case where recorded ink is not fixed yet on the recording medium in response to said instruction, wherein a discrimination regarding whether recorded ink is not yet fixed is performed on a basis of an elapsed time after completion of recording.

2. An apparatus according to claim 1, wherein the discrimination based on elapsed time is performed by using a timer also used for recovery processing of said recording head.

3. An apparatus according to claim 1, further comprising input means for inputting character data and memory means for storing the character data input by the input means.

4. A recording apparatus comprising:

discriminating means for discriminating whether a printing device connected to said apparatus executes recording with ink;

conveying means for conveying a recording medium in a recording direction and a reverse direction;

instructing means for instructing said conveying means to convey the recording medium in the reverse direction; and control means for controlling said conveying means to convey the recording medium in the reverse direction based on an instruction from said instructing means on a basis of a result of a discrimination of said discriminating means.

5. An apparatus according to claim 4, wherein said control means controls said conveying means to convey the recording medium in the reverse direction on a basis of an elapsed time after completion of recording.

6. An apparatus according to claim 4, further comprising input means for inputting character data and memory means for storing the character data input by the input means.

7. An apparatus according to claim 5, wherein a discrimination based on elapsed time is performed by using a timer also used for recovery processing of an ink recording head.

8. An apparatus according to claim 1, wherein said recording head causes a change in state of the ink using thermal energy, thereby discharging the ink.

9. A recording method comprising:

a recording step of recording by discharging an ink to a recording medium;

a conveying step of conveying the recording medium in a recording direction during said recording step;

an instructing step of instructing conveyance of the recording medium in a reverse direction opposite to the recording direction; and a conveyance control step of controlling conveyance of the recording medium so as to inhibit conveyance of the recording medium in the reverse direction in a case where the recorded ink is not fixed yet on the recording medium in response to said instruction step, wherein a discrimination regarding whether the recorded ink is not yet fixed is performed on a basis of an elapsed time after completion of the recording in said recording step.

10. An method according to claim 9, wherein the discrimination based on elapsed time is executed by using a timer also used for recovery processing of a recording head used in said recording step.

11. An method according to claim 9, further comprising an input step of inputting character data and a memory step of storing the character data which was input in said input step.

12. A recording method comprising:

a discriminating step of discriminating whether a printing device connected to a recording apparatus executes recording with ink;

a conveying step of conveying a recording medium in a recording direction during recording;

an instructing step of instructing conveyance of the recording medium in a reverse direction opposite to the recording direction; and a control step of controlling conveyance of the recording medium in the reverse direction based on an instruction in said instructing step on a basis of a result of a discrimination from said discrimination step.

13. An method according to claim 10, wherein said control step, conveyance in the reverse direction is controlled on a basis of an elapsed time after completion of recording.

14. An method according to claim 10, further comprising an input step of inputting character data and a memory step of storing the character data input in said input step.

15. An method according to claim 14, wherein a discrimination based on elapsed time is executed by using a timer also used for recovery processing of a recording head.

16. An method according to claim 9, wherein in said recording step, a change in state of the ink is caused by thermal energy, thereby discharging the ink.

17. A recording apparatus comprising:

a recording head for recording by discharging an ink to a recording medium;

conveying means for conveying the recording medium in a recording direction and a reverse direction; and control means for controlling said conveying means such that a reverse conveying operation in response to a request for said operation is not completely performed when recording has been already executed on the recording medium by said recording head.

18. A recording apparatus according to claim 17, wherein said control means controls said conveying means to convey the recording medium in the reverse direction for no more than a few lines when recording has been already executed on the recording medium.

19. A recording apparatus according to claim 18, further comprising mean for pressing the recording medium, wherein said conveying means conveys the recording medium in the reverse direction for no more than a few lines such that a pattern recorded on the recording medium immediately before a reverse conveyance makes no contact with said pressing means.

20. A recording apparatus according to claim 17, further comprising means for instructing said conveying means to convey the recording medium in the reverse direction.

21. A recording method comprising the steps of:

recording with a recording head by discharging ink onto a recording medium;

conveying the recording medium in a recording direction and a reverse direction with a conveying means; and controlling said conveying means such that a conveying operation in the reverse direction in response to a request for the operation is not completely performed when recording has been already executed on the recording medium by the recording head.

22. A recording method according to claim 21, wherein in said control step the conveying means is controlled to convey the recording medium in the reverse direction for no more than a few lines when recording has already been executed on the recording medium.

23. A recording method according to claim 22, wherein means for pressing the recording medium is provided, and the conveying means is controlled to convey the recording medium in the reverse direction for no more than a few lines such that a pattern recorded on the recording medium immediately before a reverse conveyance makes no contact with the pressing means.

24. A recording method according to claim 21, further comprising the step of instructing the conveying means to convey the recording medium in the reverse direction.

25. A recording apparatus comprising:

key input means for inputting sentence data;

display means for displaying the sentence data input by said key input means;

memory means for storing data representing the sentence data input by said key input means;

recording means for recording by discharging ink to a recording medium based on the data stored in said memory means;

conveying means for conveying the recording medium in a recording direction and in a reverse direction;

instruction means for instructing conveyance of the recording medium in the reverse direction; and conveyance control means, responsive to an instruction from said instruction means, for controlling said conveying means to inhibit conveyance of the recording medium in the reverse direction.

26. An apparatus according to claim 25, wherein said instruction means is activated so as to effect one of adding a new character and correcting a recorded character on an already recorded line.

27. An apparatus according to claim 25, further comprising a plate provided with a scale thereon for pressing the recording medium and a carriage provided with a marker corresponding to the scale, wherein said recording means comprises a recording head supported by said carriage and wherein said apparatus indicates a recording position of said recording head by the scale and the marker.

28. A recording apparatus according to claim 25, wherein said apparatus can be applied to a system comprising a plurality of apparatuses.

29. A recording apparatus comprising:

key input means for inputting sentence data;

display means for displaying the sentence data input by said key input means;

memory means for storing data representing the sentence data input by said key input means;

recording means for recording by discharging ink to a recording medium based on the data stored in said memory means;

conveying means for conveying the recording medium in a recording direction and in a reverse direction;

instruction means for instructing conveyance of the recording medium in the reverse direction; and informing means, responsive to an instruction from said instruction means, for informing that conveyance of the recording medium in the reverse direction is inhibited.

30. An apparatus according to claim 29, wherein said instruction means is activated so as to effect one of adding a new character and correcting a recorded character on an already recorded line.

31. An apparatus according to claim 29, further comprising a plate provided with a scale thereon for pressing the recording medium and a carriage provided with a marker corresponding to the scale, wherein said recording means comprises a recording head supported by said carriage and wherein said apparatus indicates a recording position of said recording head by the scale and the marker.

32. An apparatus according to claim 29, wherein said informing means informs that conveyance of the recording medium in the reverse direction is inhibited by enabling said display means to display a message indicating inhibition of reverse direction conveyance.

33. An apparatus according to claim 29, further comprising buzzer means for generating a sound, wherein said informing means controls said buzzer means to generate the sound to inform that conveyance of the recording medium in the reverse direction is inhibited.

34. A recording apparatus according to claim 29, wherein said apparatus can be applied to a system comprising a plurality of apparatuses.

35. A recording apparatus comprising:

a cartridge attachable and removable from said apparatus and which includes a recording head for recording by discharging ink to a recording medium;

conveying means for conveying the recording medium in a recording direction and a reverse direction; and control means for controlling said conveying means such that a reverse conveying operation in response to a request for the reverse conveying operation is not completely performed so as to prevent the recording medium from being smeared with the ink discharged to the recording medium.

36. A recording apparatus according to claim 35, wherein said control means controls said conveying means to convey the recording medium in the reverse direction for no more than a few lines equivalent to such a distance so as to prevent the recording medium from being smeared with the ink discharged to the recording medium.

37. A recording apparatus according to claim 36, further comprising means for pressing the recording medium wherein said conveying means conveys the recording medium in the reverse direction for no more than a few lines equivalent to such a distance so that a pattern recorded on the recording medium immediately before a reverse conveying operation makes no contact with said pressing means.

38. A recording apparatus according to claim 35, further comprising means for instructing said conveying means to convey the recording medium in the reverse direction.

39. A recording apparatus according to claim 35, wherein said apparatus can be applied to a system comprising a plurality of apparatuses.

40. A recording apparatus according to claim 35, further comprising suction means for executing a compulsive ejection of the ink from said recording head.

41. A recording apparatus according to claim 35, further comprising a lever for effecting attachment and removal of said cartridge.

42. A recording system comprising:

a host computer;

a recording head for recording by discharging ink to a recording medium;

conveying means for conveying the recording medium in a recording direction and a reverse direction; and control means for controlling said conveying means such that a reverse conveying operation in response to a request for the reverse conveying operation is not completely performed so as to prevent the recording medium from being smeared with the ink discharged to the recording medium.

43. A recording system according to claim 42, wherein said control means controls said conveying means to convey the recording medium in the reverse direction for no more than a few lines equivalent to a distance so as to prevent the recording medium from being smeared with the ink discharged to the recording medium.

44. A recording system according to claim 43, further comprising means for pressing the recording medium, wherein said conveying means conveys the recording medium in the reverse direction for no more than a few lines equivalent to such a distance so that a pattern recorded on the recording medium immediately before a reverse conveying operation makes no contact with said pressing means.

45. A recording system according to claim 44, further comprising means for instructing said conveying means to convey the recording medium in the reverse direction.

46. A recording apparatus according to claim 42, further comprising suction means for executing a compulsive ejection of the ink from said recording head.

47. A recording apparatus according to claim 42, further comprising a cartridge which can be attached and removed from said system and which is comprised of said recording head, said system further comprising a lever for handling attachment and removal of said cartridge.

48. A recording apparatus comprising:

a cartridge attachable to and removable from said apparatus and which includes a recording head for recording by discharging ink to a recording medium;

suction means for executing a compulsive ejection of the ink from said recording head;

conveying means for conveying the recording medium in a recording direction and a reverse direction; and control means for controlling said conveying means such that a reverse conveying operation in response to a request for the reverse conveying operation is not completely performed so a to prevent the recording medium from being smeared with the ink discharged to the recording medium.

49. A recording apparatus according to claim 48, wherein said control means controls said conveying means to convey the recording medium in the reverse direction for no more than a few lines equivalent to a distance so as to prevent the recording medium from being smeared with the ink discharged to the recording medium.

50. A recording apparatus according to claim 49, further comprising means for pressing the recording medium, wherein said conveying means conveys the recording medium in the reverse direction for no more than a few lines equivalent to a distance such that a pattern recorded on the recording medium immediately before a reverse conveying operation makes no contact with said pressing means.

51. A recording apparatus according to claim 48, further comprising means for instructing said conveying means to convey the recording medium in the reverse direction.

52. A recording apparatus according to claim 48, wherein said apparatus can be applied to a system comprising a plurality of apparatuses.

53. A recording apparatus according to claim 48, further comprising a lever for effecting attachment and removal of said cartridge.

54. A recording method using a cartridge which can be attached to and removed from a recording apparatus and which includes a recording head for recording by discharging ink to a recording medium, said method comprising the steps of:

conveying the recording medium in a recording direction and a reverse direction; and controlling said conveying step such that a reverse conveying operation in response to a request for the reverse conveying operation is not completely performed so as to prevent the recording medium from being smeared by the ink discharged to the recording medium.

55. A method according to claim 54, wherein said control step controls said conveying step to convey the recording medium in the reverse direction for no more than a few lines equivalent to such a distance as to prevent the recording medium from being smeared by the ink discharged to the recording medium.

56. A method according to claim 55, wherein the recording apparatus has means for pressing the recording medium, wherein said conveying step conveys the recording medium in the reverse direction for no more than a few lines equivalent to a distance such that a pattern recorded on the recording medium immediately before a reverse conveying operation makes no contact with the pressing means.

57. A method according to claim 54, further comprising the step of instructing conveyance of the recording medium in the reverse direction.

58. A method according to claim 54, wherein said method can be applied to a system comprising a plurality of apparatuses.

59. A method according to claim 54, further comprising the step of executing a compulsive ejection of the ink from the recording head with suction means.

60. A method according to claim 54, wherein the recording apparatus further comprises a lever for effecting attachment and removal of the cartridge.

61. A recording method using a cartridge which can be attached to and removed from a recording apparatus and which includes a recording head for recording by discharging ink to a recording medium and uses suction means for executing a compulsive ejection of the ink from the recording head, said method comprising the steps of:

conveying the recording medium in a recording direction and a reverse direction; and controlling said conveying step such that a reverse conveying operation in response to a request for the reverse conveying operation is not completely performed so as to prevent the recording medium from being smeared by the ink discharged to the recording medium.

62. A method according to claim 61, wherein said control step controls said conveying step to convey the recording medium in the reverse direction for no more than a few lines equivalent to such a distance so as to prevent the recording medium from being smeared by the ink discharged to the recording medium.

63. A method according to claim 62, wherein the recording apparatus has means for pressing the recording medium, wherein said conveying step conveys the recording medium in the reverse direction for no more than a few lines equivalent to a distance such that a pattern recorded on the recording medium immediately before a reverse conveying operation makes no contact with the pressing means.

64. A method according to claim 61, further comprising the step of instructing conveyance of the recording medium in the reverse direction.

65. A method according to claim 61, wherein said method can be applied to a system comprising a plurality of apparatuses.

66. A method according to claim 61, wherein the recording apparatus further comprises a lever for effecting attachment and removal of the cartridge.

67. A recording apparatus comprising:

a cartridge attachable and removable from said apparatus and which includes a recording head for recording by discharging ink to a recording medium;

conveying means for conveying the recording medium in a recording direction and a reverse direction; and control means for controlling said conveying means such that a reverse conveying operation in response to a request for the reverse conveying operation is not performed so as to prevent the recording medium from being smeared with the ink discharged to the recording medium.

68. A recording apparatus according to claim 67, further comprising means for instructing said conveying means to convey the recording medium in the reverse direction.

69. A recording apparatus according to claim 67, wherein said apparatus can be applied to a system comprising a plurality of apparatuses.

70. A recording apparatus according to claim 67, further comprising suction means for executing a compulsive ejection of the ink from said recording head.

71. A recording apparatus according to claim 67, further comprising a lever for effecting attachment and removal of said cartridge.

72. A recording system comprising:

a host computer;

a recording head for recording by discharging ink to a recording medium;

conveying means for conveying the recording medium in a recording direction and a reverse direction; and control means for controlling said conveying means such that a reverse conveying operation in response to a request for the reverse conveying operation is not performed so as to prevent the recording medium from being smeared with the ink discharged to the recording medium.

73. A recording apparatus according to claim 72, further comprising means for instructing said conveying means to convey the recording medium in the reverse direction.

74. A recording apparatus according to claim 72, further comprising suction means for executing a compulsive ejection of the ink from said recording head.

75. A recording apparatus according to claim 72, further comprising a cartridge which can be attached and removed from said system and which is comprised of said recording head, said system further comprising a lever for handling attachment and removal of said cartridge.

76. A recording apparatus comprising:

a cartridge attachable to and removable from said apparatus and which includes a recording head for recording by discharging ink to a recording medium;

suction means for executing a compulsive ejection of the ink from said recording head;

conveying means for conveying the recording medium in a recording direction and a reverse direction; and control means for controlling said conveying means such that a reverse conveying operation is not performed so as to prevent the recording medium from being smeared with the ink discharged to the recording medium.

77. A recording apparatus according to claim 76, further comprising means for instructing said conveying means to convey the recording medium in the reverse direction.

78. A recording apparatus according to claim 76, wherein said apparatus can be applied to a system comprising a plurality of apparatuses.

79. A recording apparatus according to claim 76, further comprising a lever for effecting attachment and removal of said cartridge.

80. A recording method using a cartridge which can be attached to and removed from a recording apparatus and which includes a recording head for recording by discharging ink to a recording medium, said method comprising the steps of:

conveying the recording medium in a recording direction and a reverse direction; and controlling said conveying step such that a reverse conveying operation in response to a request for the reverse conveying operation is not performed so as to prevent the recording medium from being smeared by the ink discharged to the recording medium.

81. A method according to claim 80, further comprising the step of instructing conveyance of the recording medium in the reverse direction.

82. A method according to claim 80, wherein said method can be applied to a system comprising a plurality of apparatuses.

83. A method according to claim 80, further comprising the step of executing a compulsive ejection of the ink from the recording head with suction means.

84. A method according to claim 80, wherein the recording apparatus further comprises a lever for effecting attachment and removal of the cartridge.

85. A recording method using a cartridge which can be attached to and removed from a recording apparatus and which includes a recording head for recording by discharging ink to a recording medium and uses suction means for executing a compulsive ejection of the ink from the recording head, said method comprising the steps of:

conveying the recording medium in a recording direction and a reverse direction; and controlling said conveying step such that a reverse conveying operation in response to a request for the reverse conveying operation is not performed so as to prevent the recording medium from being smeared by the ink discharged to the recording medium.

86. A method according to claim 85, further comprising the step of instructing conveyance of the recording medium in the reverse direction.

87. A method according to claim 85, wherein said method can be applied to a system comprising a plurality of apparatuses.

88. A method according to claim 85, wherein the recording apparatus further comprises a lever for effecting attachment and removal of the cartridge.

* * * * *

UNITED STATES PATENT AND TRADEMARK OFFICE
CERTIFICATE OF CORRECTION

PATENT NO. : 5,365,256

DATED : November 15, 1994

INVENTOR(S) : Takahashi

It is certified that error appears in the above-indentified patent and that said Letters Patent is hereby corrected as shown below:

COLUMN 2:

Line 62, "letters" should read --characters--.
Line 63, "characters," should read --letters,--.

COLUMN 4:

Line 18, "be" (first occurrence) should be deleted.
Line 28, "dusts," should read --dust,--.

COLUMN 5:

Line 66, "an enough" should read --a sufficiently--.

COLUMN 9:

Line 13, "An method" should read --A method--.
Line 17, "An method" should read --A method--.
Line 35, "An method according to claim 10," should read --A method according to claim 12,--.
Line 39, "An method according to claim 10," should read --A method according to claim 12,--.
Line 43, "An method according to claim 14," should read --A method according to claim 13,--.
Line 47, "An method" should read --A method--.

COLUMN 12:

Line 53, "apparatus" should read --system--.

UNITED STATES PATENT AND TRADEMARK OFFICE

CERTIFICATE OF CORRECTION

PATENT NO. : 5,365,256 Page 2 of 2

DATED : November 15, 1994

INVENTOR(S) : Takahashi

It is certified that error appears in the above-indentified patent and that said Letters Patent is hereby corrected as shown below:

Line 56, "apparatus" should read --system--.

COLUMN 15:

Line 17, "apparatus" should read --system--.
Line 21, "apparatus" should read --system--.
Line 24, "apparatus" should read --system--.

Signed and Sealed this

Second Day of May, 1995

Attest:

BRUCE LEHMAN

*Attesting Officer*

*Commissioner of Patents and Trademarks*